March 28, 1967 J. D. BERING 3,311,342
SLEEVE-TYPE LINE VALVE
Filed Jan. 26, 1966 2 Sheets-Sheet 1

Section A-A

INVENTOR.
JORGEN BERING
BY
Julian Caplan

INVENTOR.
JORGEN BERING
BY Julian Caplan

United States Patent Office 3,311,342
Patented Mar. 28, 1967

3,311,342
SLEEVE-TYPE LINE VALVE
Jorgen D. Bering, Occidental, Calif. 95465
Filed Jan. 26, 1966, Ser. No. 523,132
3 Claims. (Cl. 251—344)

This invention is a continuation-in-part of copending application Ser. No. 322,561, filed Nov. 8, 1963, now Patent No. 3,232,313, which is a division of Ser. No. 42,641, now Patent No. 3,121,444.

This invention relates to a line valve, wherein the flow is along a pipe in which the valve is inserted, as distinguished from valves where discharge is offset or at an angle relative to inlet. Further, the intake and discharge are closed.

This invention relates to valves used in the control of liquid flow. The operation of such valves is at times exposed to disturbances caused by the line pressure of the liquid. It is the object of my invention to provide efficient valves resistant to disturbances of this nature. It is furthermore the object of my invention to provide design for such disturbance resistant valves that can be made in stainless steel and used in sanitary and corrosive-resistant operation when open flow, proper drainage, ready assembly and absence of cavities are factors of importance.

The extreme sensitivity of sainless steel valves (or valves of seating and sealing parts in stainless steel) to line pressure disturbance seems related to the unique surface character of this material which includes the so-called "galling" effect, or resistance to mobile area contact between parts made of this material. Any unbalanced or jolting valve action which invites violent area contact between stem and housing will tend to cause sticking of the valve and severe damage to the contacting surfaces. Once brought into a "cocked" or locked-unaligned position by jolting action, a valve in stainless steel will tend to "grab" or remain locked and exposed to cutting action. A phase of my invention is specifically concerned with the elimination of jolting action from line pressure disturbances and damage of this source to valves of stainless steel.

Although this construction is particularly suitable for fabrication of stainless steel, it is also valuable in other valve construction materials.

Other features of valves incorporating the design of my invention are open flow, absence of pockets, proper drainage, and a simplicity in structure that lends itself to execution in stainless steel and usage in sanitary and corrosive resistant operation.

In the example of valves of my invention in the drawing, the balancing of the lines pressures takes the form of equalizing the hydrostatic pressures acting upon the valve in closed position. The related effect on the operation in open position seems to be one of smoothly approaching a balanced state as the valve closes, versus a jolting action toward an ultimately unbalanced condition.

For smooth action and effective closure, and especially in view of the hazards related to stainless steel area contact, my invention comprises these specifications for the seating and sealing means; the seating should be obtained by a spherical stem section rendering line contact with a seating port in the housing which includes a cone section of an angle of not over 60 degrees with the axis of the seating port; in case of the means for mobile sealing the diametrical clearance between the cylindrical stem section and the bore of the cylindrical housing port should be less than .010″.

Another feature of the invention is that the valve is balanced against line pressure from either inlet or discharge direction and this materially improves the opening and closing action.

Still another feature of the invention is that flow through the line assists in opening the valve.

An important advantage of the invention is the fact that it is adaptable to actuation by air or other fluid. The construction is such that leakage of air or actuating fluid into the product in the valve is eliminated. This feature is of great importance in sanitary construction.

Other objects of the present invention will become apparent upon reading the following specification and referring to the accompanying drawings in which similar characters of reference represent corresponding parts in each of the several views.

In the drawings.

The present invention includes features disclosed in Patent No. 3,121,444, and to facilitate description, corresponding parts have been designated with the same reference numerals.

Figure 3:
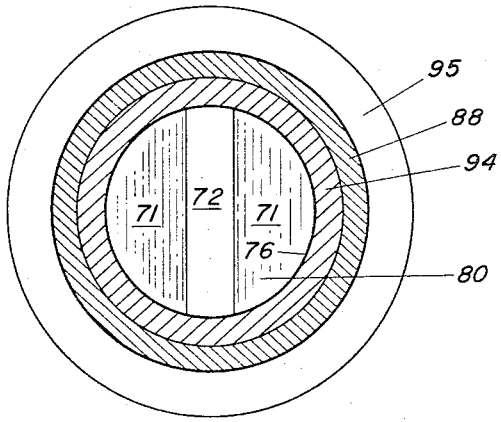
FIG. 3 is a transverse section taken substantially along line A—A of FIG. 1.
Figure 1:
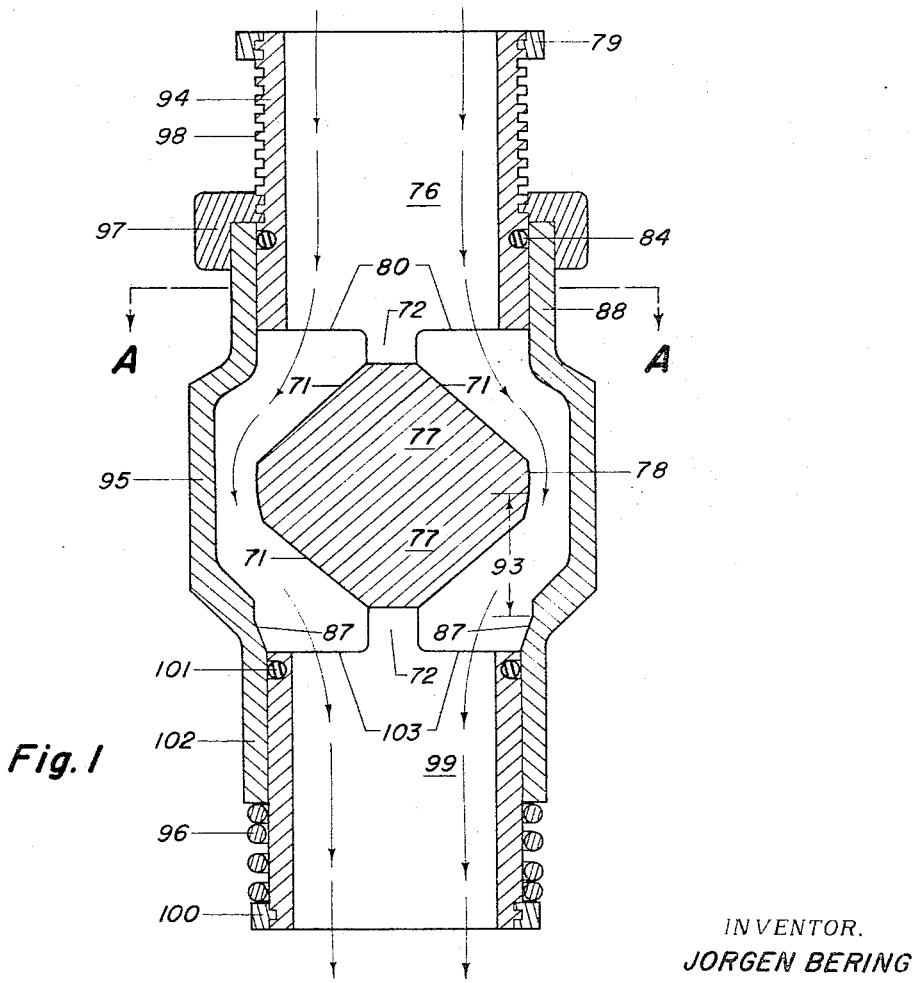
FIG. 1 is a longitudinal midsectional view through a manually-actuated valve in accordance with this invention.

FIG. 1 shows the manually-actuated valve in open position. The axially slidable sleeve or housing 95 can be moved from the illustrated open position by sliding upward to seating closure against the stationary stem 94 by the action of the spring 96 against the manually operated nut 97 turning on the thread 98 on the stem 94.

The stationary stem 94 comprises a tubular section 76 which ends in thread for the union part 79 for connection with the line, and which has an exterior groove for containment of the packing rings 84 that provides mobile liquid sealing over the stroke 93 of the valve against the bore of the housing section 88. The tubular section 76 leads through several ports 80 (two being illustrated) to the center section 86 (see FIG. 2) of the housing 95, and extends into a solid section 77 that includes the seating section 78. From here the solid section 77 extends to a tubular section 99 which ends in thread for the union part 100 for connection with the line, and which has an exterior groove for containment of the packing ring 101 that provides mobile liquid sealing over the stroke 93 of the valve against the bore of the cylindrical housing section 102. Several ports 103 (two being illustrated) connect the center section 86 with the tubular section 99.

The mobile housing 95 comprises a center section 86 of sufficient orifice to allow free liquid passage around the seating section 78 of the stem section 77. The seating port 87 provides liquid tight closure against the seating section 78 of the stem. Both ends of the center section 86 extend into tubular sections 88 and 102.

The movement of the mobile housing 95, or the valve action from open to closed position over the stroke 93, is caused by expansion of the compression spring 96 as controlled manually by the nut 97 and turning on the thread 98. This action, as here described, represents an example of the various ways for manual movement of the housing over the stroke of the valve.

Other types of manual actuators may be substituted for spring 96 and nut 97, as will readily occur to one skilled in the valve art. A feature of the actuation is that housing 95 need not turn relative to the stationary valve parts but merely slides. This feature reduces the tendency to gall and has other advantages.

It should also be noted that openings 80 comprise essentially the entire cross-section of section 76. Outward-downward slanted surfaces 71 are spaced relative to openings 80 by narrow stem sections 72. Hence restriction to full flow through the valve is avoided.

Figure 2:
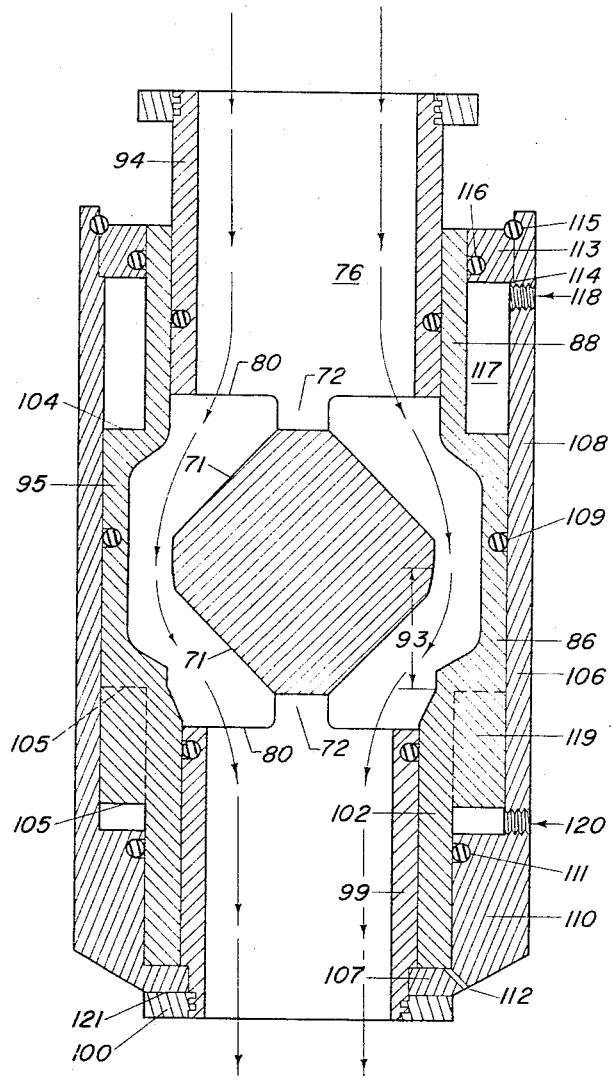
FIG. 2 is a view similar to FIG. 1, of a mechanically actuated valve.

FIG. 2 shows the movement of the mobile housing 95 by means of compressed air or pressurized liquid in so-called "power" or "automated" operation. My invention lends itself particularly well to this type of operation.

Due to the pressure balancing of the valve minimal operation power is required, and the power demand is smooth and even over the stroke. A compact, integrated valve and actuator structure becomes possible. An important feature of my invention is the prevention of any possibility of leakage of actuating air or liquid into the product.

With the exception of minor changes in dimensions and in the outside contour of the mobile housing 95 (two flat areas 104 and 105 on a right angle with the central axis of the valve being required) the stem 94 and the housing 95 are the same as shown in FIG. 1.

The movement of the housing 95 by compressed air or pressurized liquid is made possible by the sleeve 106 which comprises a cylindrical section 108 with a bore permitting movement along the outside of the central section 86 of the housing 95, liquid and air tight sealing assured by the packing ring 109 contained in a groove cut in the wall of the housing 95; and a narrower cylindrical section 110 the bore of which permits movement against the outside of the cylindrical section 102 of the housing 95, liquid and air tight sealing being assured by the packing ring 111 contained in a groove cut into the bore of the sleeve section 110; and finally a collar section 107 of a bore that locks the entire sleeve 106 between the union part 100 and the shoulder 121 cut into the cylindrical section 99 of the stem 94. A vent opening 112 through the collar permits venting and movement of the housing section 102 inside the lower section 110 of the sleeve 106. A collar 113 closes the space between the ends of the sleeve section 108 and the cylindrical housing section 88 locked air tight into position by the lock ring 115 and resulting on the shoulder 114 on the inside of sleeve section 108, and movably sealed against the housing section 88 by the packing ring 116 contained in a groove cut in the bore of the collar 113.

When the valve is in open position, as shown in FIG. 2, a cavity 117 is maintained under collar 113 with inlet 118 for compressed air or pressurized liquid and of sufficient length to accommodate the stroke 93 of the valve. A similar cavity 119 is created inside the bottom end of sleeve 108 when the valve is in closed position with air and liquid inlet 120.

When the valve is completely "automated" or "power" operated, the compressed air or liquid is injected through the port 120 into the chamber 119, thereby lifting the mobile housing 95 into seating for closing of the valve; for opening, the pressure action is changed to the chamber 117 through the port 118.

For partial power operation, as with opening by power with assurance that the valve is closed in case of power failure, the closing action may be performed by means of a spring placed in the chamber 119. The reverse action is obtained by placing the spring in chamber 117. The combination of spring and power operation may be found useful of throttling action.

In accordance with the structure of my invention the effect of the hydrostatic line pressure upon the valve (downward on the drawings) in closed position is balanced and eliminated by the exertion of equal pressure upon equal areas in opposite directions, in this case upon the orifice of the seating port 87 (see FIG. 1) which is kept identical to that of the bore of the cylindrical housing section 88, and by the opposing identical atmospheric pressure at either end of the housing. The back pressure from stem section 99 is balanced, as is the line pressure by the identical size of seat 87 relative to the orifice of cylindrical housing section 102. The result is smooth and dependable operation of the valve and minimal power demand for actuation.

Although the foregoing invention has been described in some detail, by way of illustartion and example for purposes of clarity of understanding, it is understood that certain changes and modifications may be practiced within the spirit of the invention and scope of the appended claims.

What is claimed is:
1. A sleeve-type valve comprising a first conduit having a first cylindrical exterior and an end terminus, a plug fixed relative to said first conduit having a first valve seat on the exterior of said plug, a first spacer fixed to said first conduit and to said plug spacing said plug away from said end terminus of said conduit; a sleeve having a first end slidable over said first cylindrical exterior, an enlarged internal diameter central portion and a second end of diameter less than said central portion and formed with an internal second seat cooperable with said first seat to close said valve when said sleeve is moved toward said first conduit and to open said valve when said sleeve is moved away from said first conduit, said plug having an enlarged diameter substantially equal to the exterior of said first conduit and said sleeve being internally dimensioned so that the space between said plug and the interior of said sleeve on the side of said seats toward said conduit is substantially as great as the internal area of said conduit; a second conduit having a second cylindrical exterior axially aligned and spaced from said first conduit, a second spacer fixed to said second conduit and to said plug spacing said second conduit from said plug, said plug having surfaces slanted distally outward relative to said conduits in directions away from said conduits, said sleeve formed with a second end slidable over said second cylindrical exterior, said sleeve longitudinally slidable and non-rotative relative to said conduits and said plug, said sleeve at all times sealing both said conduits from communication with atmosphere, an abutment on the exterior of said second conduit opposite said plug, the end of said first conduit opposite said end terminus being externally threaded; said seats being of stainless steel; a nut on the threaded exterior of said first conduit, one end of said sleeve bearing against but non-rotative relative to said nut, and a spring around said second conduit bearing against said sleeve and said butment.

2. A valve according to claim 1, in which one of said second seats is a spheroidal segment and the other is a cone.

3. A sleeve-type valve comprising a first conduit having a first cylindrical exterior and an end terminus, a plug fixed relative to said first conduit having a first valve seat on the exterior of said plug, a first spacer fixed to said first conduit and to said plug spacing said plug away from said end terminus of said conduit; a sleeve having a first end slidable over said first cylindrical exterior, an enlarged internal diameter central portion and a second end of diameter less than said central portion and formed with an internal second seat cooperable with said first seat to close said valve when said sleeve is moved toward said first conduit and to open said valve when said sleeve is moved away from said first conduit, said plug having an enlarged diameter substantially equal to the exterior of said first conduit and said sleeve being internally dimensioned so that the space between said plug and the interior of said sleeve on the side of said seats toward said conduit is substantially as great as the internal area of said conduit; a second conduit having a second cylindrical exterior axially aligned and spaced from said first conduit, a second spacer fixed to said second conduit and to said plug spacing said second conduit from said plug, said plug having surfaces slanted distally outward relative to said conduits in directions away from said conduits, said sleeve formed with a second end slidable over said second cylindrical exterior, said sleeve longitudinally slidable and non-rotative relative to said conduits and said plug, said sleeve at all times sealing both said conduits from communication with atmosphere, said seats being of stainless steel; the exterior of both said sleeves being externally cylindrical, a second sleeve surrounding said first mentioned sleeve and in sliding contact with a portion of both said ends of said first mentioned sleeve and spaced therefrom intermediate said ends, means on said first and second sleeves defining at least one chamber, means sealing the outer ends of said chamber to the exterior of said first mentioned sleeve and isolating said chamber in sanitary fashion from fluid within said conduits and the interior of said first mentioned sleeve means securing said second sleeve against movement relative to said conduits, fluid pressure means for applying fluid pressure inside said chamber to move said first mentioned sleeve in at least one direction longitudinally relative to said conduits and to said second sleeve to actuate said first mentioned sleeve to open and close said valve.

References Cited by the Examiner

UNITED STATES PATENTS

| | | | |
|---|---|---|---|
| 970,225 | 9/1910 | Holden | 251—344 XR |
| 1,340,107 | 5/1920 | Blanche | 251—344 |
| 1,731,184 | 10/1929 | Thomas | 251—347 XR |
| 2,278,313 | 3/1942 | Hornostel | 251—344 |
| 2,505,410 | 4/1950 | Klaas | 251—344 XR |
| 2,645,452 | 7/1953 | Lucas et al. | 251—368 XR |
| 2,654,395 | 10/1953 | Kaye | 251—368 XR |
| 2,760,754 | 8/1956 | Gladstone | 251—344 |

FOREIGN PATENTS

| | | |
|---|---|---|
| 3,424 | 1866 | Great Britain. |
| 183,386 | 10/1955 | Austria. |
| 1,097,386 | 2/1955 | France. |
| 1,190,161 | 3/1959 | France. |

M. CARY NELSON, *Primary Examiner.*

S. SCOTT, *Assistant Examiner.*